United States Patent
Somekh et al.

(10) Patent No.: US 9,910,898 B2
(45) Date of Patent: Mar. 6, 2018

(54) SMART EXPLORATION METHODS FOR MITIGATING ITEM COLD-START PROBLEM IN COLLABORATIVE FILTERING RECOMMENDATION SYSTEMS

(71) Applicant: Yahoo Holdings, Inc., Sunnyvale, CA (US)

(72) Inventors: Oren Shlomo Somekh, Beit Yehoshua (IL); Michal Aharon, Haifa (IL); Shahar Golan, Haifa (IL); Noa Avigdor-Elgrabli, Haifa (IL); Dana Drachsler Cohen, Haifa (IL)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 300 days.

(21) Appl. No.: 14/857,258

(22) Filed: Sep. 17, 2015

(65) Prior Publication Data

US 2017/0083522 A1 Mar. 23, 2017

(51) Int. Cl.
| | |
|---|---|
| *G06F 17/30* | (2006.01) |
| *G06F 7/00* | (2006.01) |
| *G06N 99/00* | (2010.01) |
| *G06F 3/0484* | (2013.01) |

(52) U.S. Cl.
CPC ...... *G06F 17/3053* (2013.01); *G06F 3/04842* (2013.01); *G06F 17/30324* (2013.01); *G06F 17/30867* (2013.01); *G06N 99/005* (2013.01)

(58) Field of Classification Search
CPC .......... G06F 17/3053; G06F 17/30324; G06F 3/04842; G06F 17/30867; G06N 99/005
USPC ....................................................... 707/734
See application file for complete search history.

(56) References Cited

U.S. PATENT DOCUMENTS

| | | | | |
|---|---|---|---|---|
| 2015/0187024 A1* | 7/2015 | Karatzoglou | ...... | G06Q 30/0201 705/319 |
| 2015/0278908 A1* | 10/2015 | Nice | ...... | G06Q 30/02 705/26.7 |
| 2016/0284003 A1* | 9/2016 | Renders | ...... | G06Q 30/0631 |

OTHER PUBLICATIONS

Anava, O., et al., "Budget-Constrained Item Cold-Start Handling in Collaborative Filtering Recommenders via Optimal Design," In Proc. of WWW '2015, 11 pages (Nov. 19, 2014).
Chapelle, Olivier, et al., "An Empirical Evaluation of Thompson Sampling," Advances in Neural Information Processing Systems, 9 pages (2011).
Gantner, Z., et al., "Learning Attribute-to-Feature Mappings for Cold-Start Recommendations," In Proc. ICDM, 2010, 10 pages (Dec. 2010).

* cited by examiner

*Primary Examiner* — Kuen Lu
(74) *Attorney, Agent, or Firm* — Brinks Gilson & Lione

(57) ABSTRACT

Systems and methods for building a latent item vector and item bias for a new item in a collaborative filtering system are disclosed. The method includes dividing incoming users into intervals with each interval having a learning phase and a selection phase. The learning phase scores each incoming user according to a best estimate latent vector and bias and saves the highest score. In the selection each incoming user is scored and a user exceeding the highest score is selected. The best estimate latent vector and bias is then updated based on the user's vector and bias, and the user's interaction with the item. The updated best estimate latent vector is then used in further intervals for learning and selecting users.

17 Claims, 4 Drawing Sheets

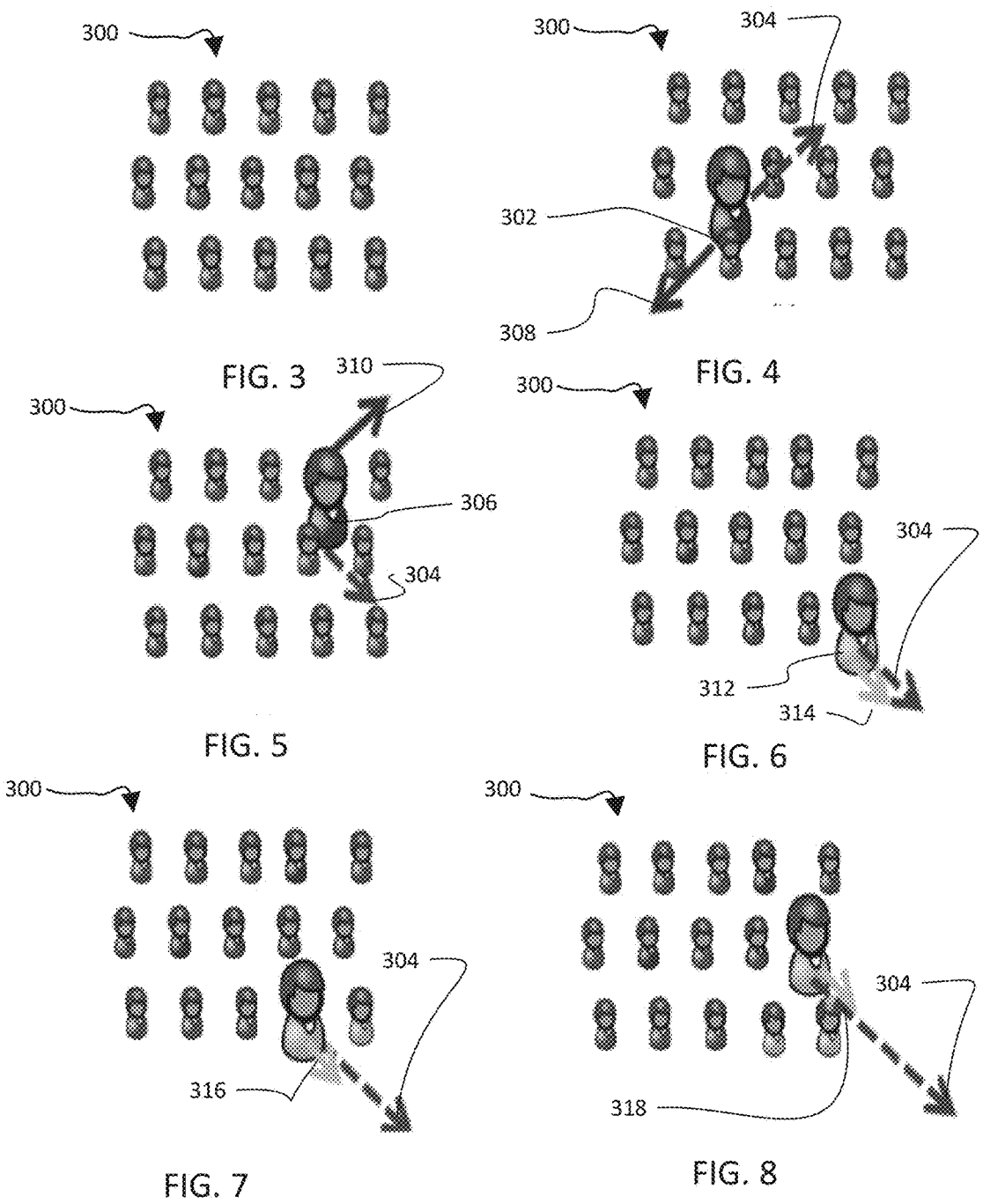

SMART EXPLORATION METHODS FOR MITIGATING ITEM COLD-START PROBLEM IN COLLABORATIVE FILTERING RECOMMENDATION SYSTEMS

BACKGROUND

1. Technical Field Text

The disclosed embodiments are related to recommendation systems and more particularly to systems and methods for mitigating the item cold-start problem in collaborative filtering recommendation systems by characterizing new items using the interactions and characterizations of users that were selected to explore these new items in an online environment.

2. Background Information

Recommendation systems aim to present users with the most relevant items (e.g., movies, songs, advertisements, etc.) by predicting the user interest. Typically, they base their predictions on predefined features and user activity. User activity refers to numerical ratings or binary interactions users provide that reflect their interest in certain items. Techniques that rely on features are known as content-based while techniques that rely solely on user activity are known as collaborative filtering (CF). CF is widely used in recommenders due to its high accuracy, good scalability, and ability to execute without content analysis for feature extraction.

CF suffers when dealing with new items or users, known as the cold-start problem. This problem arises because the system does not have relevant interactions for the new entity (user or item). Thus, when a new entity (user or item) appears and there are no relevant historical interactions, the CF recommender cannot model the new entity reliably. While users and items are usually represented similarly in the latent vector space, these two problems are essentially different. The user cold-start problem, in which a new user joins the system, is commonly addressed by interviewing the new user and asking her to rate several key items. Unfortunately, the item cold-start problem is not as simple because items cannot be interviewed and typically there are no users willing to rate every new item. Another difference is that in most settings the number of users is much larger than the number of items, hence a typical item usually gets more ratings than an individual user provides, which may affect the modeling.

To model new items, CF recommenders select users for exploration and record their interactions with the new items. However, recommender systems typically have only a handful of slots to present items, for both exploration and recommendation, and since their goal is to present recommendations, the exploration process must be efficient and accurate. Not only are CF recommenders expected to meet these two goals but they also face the challenge that users arrive in an online fashion, namely systems do not know which users will arrive and when. This enforces the exploration process to decide whether to present to users new items immediately upon their arrival.

A common approach to mitigate the item cold-start problem is by providing additional attributes of the new items to the recommender systems. This approach is known as the hybrid approach since it combines CF with content-based methods. Past approaches have used a hybrid approach based on Boltzmann machines. In other approaches, a regression-based latent factor model in which the items' and users' latent vectors are obtained from low-rank matrix decomposition of a matrix whose products are weight matrices and attribute matrices. In still other approaches, the regression-based latent factor model is improved by solving a convex optimization problem to estimate the weight matrices.

Other works have addressed a different setting in which there are few ratings to the new items but there is no item content or context information. They showed that new items' latent factor vectors could be estimated by a linear combination of the raters' latent factor vectors and their ratings (without retraining the model). A common approach to obtain these ratings for new items to bootstrap their modeling devotes a portion of the user traffic for random exploration of the new items.

Thus, there exists a technical problem of how to implement a collaborative filtering recommendation system when dealing with relatively new items. It would be beneficial if such a system were efficient, requiring few impressions for new items, and accurate, obtaining good results with the few impressions. The particular context of the problem is described herein as an advertising system and recommendation of new items. However, the solutions described herein may be readily extended to other systems using collaborative filtering that experience the cold start problem.

BRIEF SUMMARY

In one aspect of the disclosure a method for building a latent item vector and item bias for a new item in a collaborative filtering recommendation system having an otherwise fully trained content filtering model includes determining a first quantity of users to use as a training group and a second quantity of users to use as a recommendation group, receiving a first plurality of users with each user received sequentially, scoring each of the first plurality of users based on each user's vector and bias, and an best estimate latent vector to find a maximum individual score for the first plurality of users, receiving a second plurality of users with each user received sequentially, scoring each of the second plurality of users as they arrive with each user's vector and bias, and the best estimated latent vector, in response to an event selected from the group consisting of receiving a user of the second plurality of users with a score greater than the maximum individual score and receiving a final user from among the second plurality of users, selecting the user for presenting the item, and recording the selected user's interaction with the item and updating the best estimate latent vector based on the user's vector, bias, and interaction.

In some embodiments, calculating each score includes adding the user's bias to a dot product of the user's vector and the best estimate latent vector.

In some embodiments, the best estimate latent vector is updated to a vector and bias that give a minimum squared error between a predicted interaction and the selected user's vector, bias, and interaction.

In some embodiments, the method further includes determining a third quantity of users to use as a second training group and a fourth quantity of users to use as a second recommendation group, receiving a third plurality of users with each user received sequentially, scoring each of the third plurality of users based on each user's vector and bias, and the updated best estimate latent vector to find a second maximum individual score for the third plurality of users, receiving a fourth plurality of users with each user received sequentially, scoring each of the fourth plurality of users as they arrive with each user's vector and bias, and the updated best estimate latent vector, in response to an event selected from the group consisting of receiving a second user of the fourth plurality of users with a score greater than the second maximum individual score and receiving a second final user from among the fourth plurality of users, selecting a second user for presenting the item, and recording the selected second user's interaction with the item and updating the best estimate latent vector and bias based on the second user's vector, bias, and interaction.

In some embodiments, the training group and the selection group each have the same quantity of users. In some embodiments, the best estimate latent vector is initially a zero vector.

In another aspect a method for building a latent item vector and item bias for a new item in a collaborative filtering recommendation system includes receiving a quantity of users for selection as a test user, determining an interval for each of the quantity of users for selection as a test user, dividing each interval into a training phase and a selection phase, and for each interval: sequentially receiving a first plurality of users during the training phase, scoring each of the first plurality of users based on each user's vector and bias, and an best estimate latent vector to find a maximum individual score for the first plurality of users, sequentially receiving a second plurality of users during the selection phase, scoring each of the second plurality of users as they arrive with each user's vector and bias, and the best estimate latent vector, in response to an event selected from the group consisting of receiving a user of the second plurality of users with a score greater than the maximum individual score and receiving a final user from among the second plurality of users, selecting the user for presenting the item, and recording the selected user's interaction with the item and updating the best estimate latent vector and bias to an updated best estimate latent vector and bias that gives a minimum squared error between predicted interactions of previously selected users and the actual interactions of the previously selected users based on the previously selected users' vectors, biases, and interactions.

In some embodiments, calculating each score includes adding the user's bias to a dot product of the user's vector and the best estimate latent vector.

In some embodiments, each interval contains the same number of users. In some embodiments the training phase and the selection phase have the same number of users. In some embodiments, the best estimate latent vector is initially a zero vector. In some embodiments, an interaction includes leaving feedback on an item.

In some embodiments, the method builds a latent item vector and item bias for a plurality of new items. In some embodiments, each of the users is scored for each of the plurality of items and the maximum score is the maximum for all of the items. In some embodiments, each of the users is scored for each of the plurality of items and a maximum score is saved for each item. In some embodiments, each of the users is scored for each of the plurality of items and the combination of a user and item having the highest score is selected.

In another aspect a system for building a latent item vector and item bias for a new item in a collaborative filtering recommendation system includes a processor and memory storing computer executable instructions, that when implemented by the processor cause the system to perform functions. The functions include receiving a quantity of users for selection as a test user, determining an interval for each of the quantity of users for selection as a test user dividing each interval into a training phase and a selection phase, and for each interval: sequentially receiving a first plurality of users during the training phase, scoring each of the first plurality of users based on each user's vector and bias, and an best estimate latent vector to find a maximum individual score for the first plurality of users, sequentially receiving a second plurality of users during the selection phase, scoring each of the second plurality of users as they arrive with each user's vector and bias, and the best estimate latent vector, in response to an event selected from the group consisting of receiving a user of the second plurality of users with a score greater than the maximum individual score and receiving a final user from among the second plurality of users, selecting the user for presenting the item; and recording the selected user's interaction with the item and updating the best estimate latent vector and bias based on the user's vector, bias, and interaction.

BRIEF DESCRIPTION OF THE DRAWINGS

FIG. 3 illustrates a schematic of users who may show interest in the new item.

FIG. 4 illustrates the schematic of FIG. 3, with the first selected user that did not interact with the new item, and the resulting best estimate latent vector.

FIG. 5 illustrates the schematic of FIG. 3, with the second selected user that did interact with the new item, and the resulting updated best estimate latent vector.

FIG. 6 illustrates the schematic of FIG. 3, with the third selected user that did interact with the new item, and the resulting updated best estimate latent vector aligning with the user vector.

FIG. 7 illustrates the schematic of FIG. 3, with the fourth selected user that did interact with the new item, and the resulting updated best estimate latent vector aligning with the user vector.

FIG. 8 illustrates the schematic of FIG. 3, with the fifth selected user that did interact with the new item, and the resulting updated best estimate latent vector aligning with the user vector.

DETAILED DESCRIPTION

Figure 1:
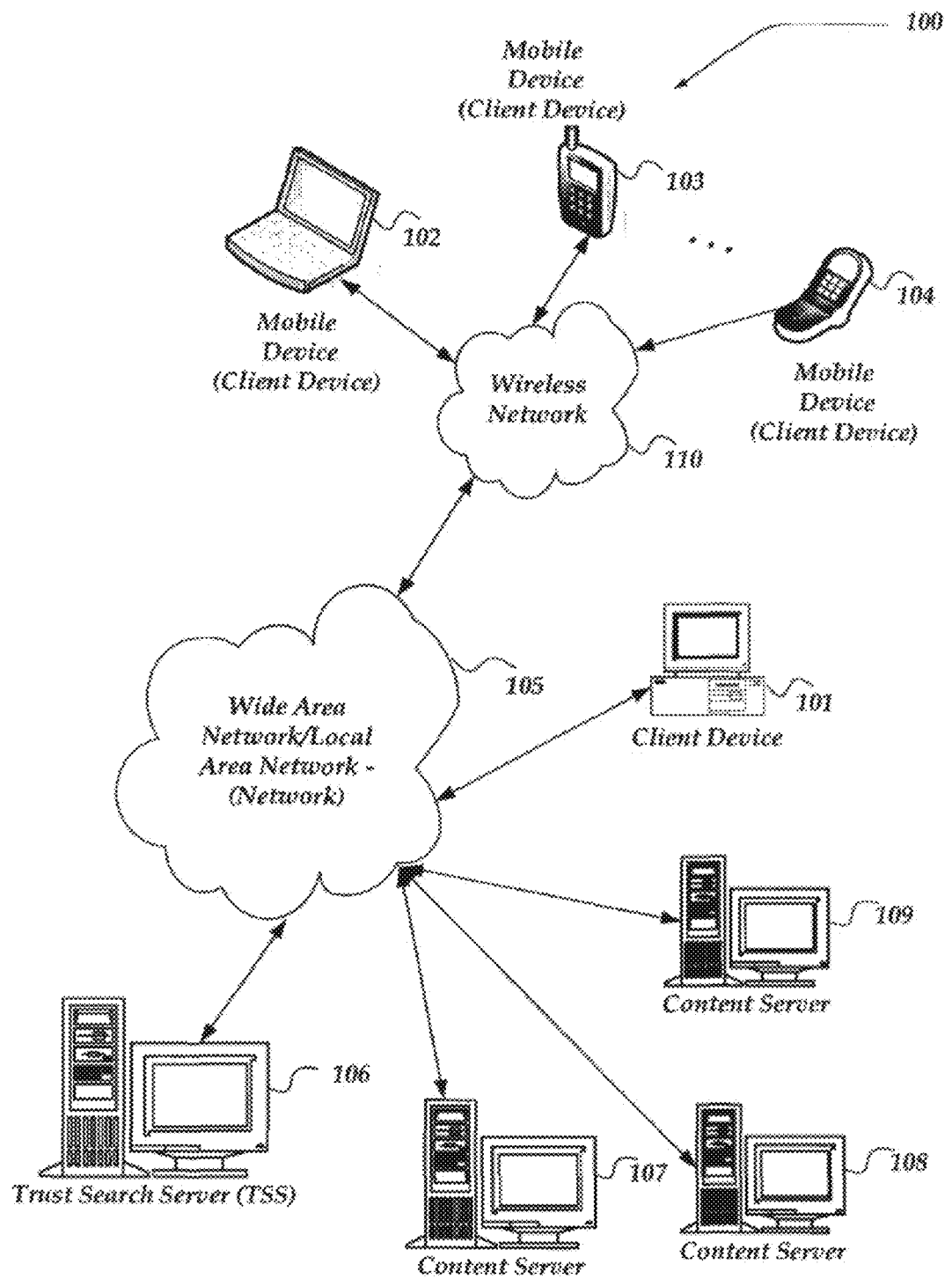
FIG. 1 illustrates a network

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment"

as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The claimed subject matter is related to monetization of advertising. Various monetization techniques or models may be used in connection with advertising, including banner advertisements, rich media advertisements, video advertisements, advertising associated with user search queries, or non-sponsored search advertising, including graphical or display advertising. In an auction type online advertising marketplace, advertisers may bid in connection with placement of advertisements, although other factors may also be included in determining advertisement selection or ranking. Bids may be associated with amounts advertisers pay for certain specified occurrences, such as for placed or clicked on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

The disclosed subject matter further relates to systems and methods recommending items for a user through collaborative filtering. The described systems and methods address what is commonly referred to as the item "cold start" problem and works to quickly record useful interactions for modeling the item. The item may be an advertisement relevant to the user, or other content targeted to users.

Ad Network

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

Illustrative Environment

FIG. 1 is a schematic diagram illustrating an example embodiment of a network 100. Other embodiments that may vary, for example, in terms of arrangement or in terms of type of components, are also intended to be included within claimed subject matter. As shown, FIG. 1, for example, includes a variety of networks, such as local area network (LAN)/wide area network (WAN) 105 and wireless network 110, a variety of devices, such as client device 101, mobile devices 102, 103, and 104, and a variety of servers such as content servers 107, 108, and 109, and search server 106.

The network 100 may couple devices so that communications may be exchanged, such as between a client device, a search engine, and an ad server, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
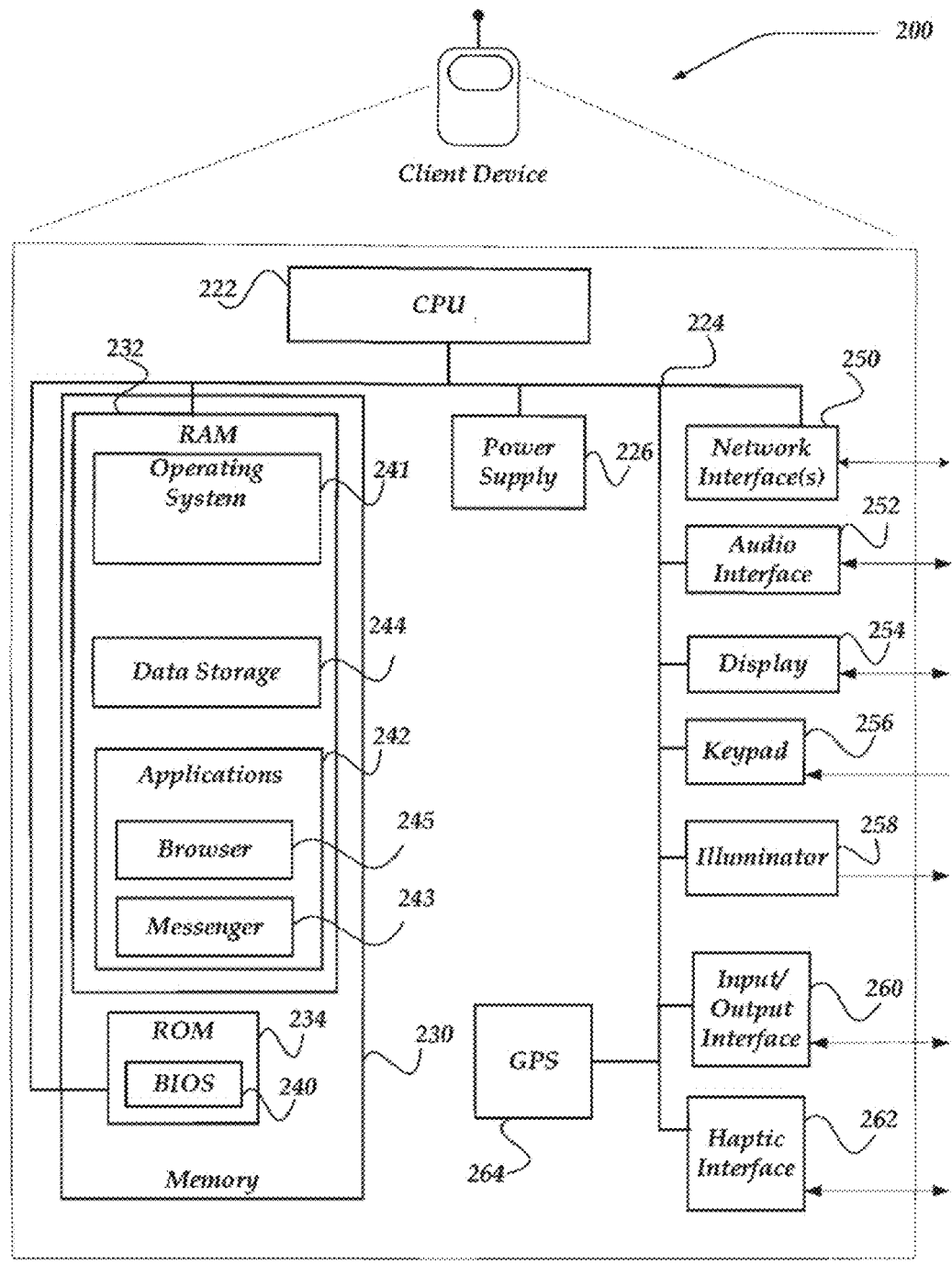
FIG. 2 illustrates a computing device.

FIG. 2 illustrates an example schematic of an embodiment of a computing device 200. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services, such as search services, indexing services, file services, email services, communication services, and content services. Servers vary in application and capabilities and need not contain all of the components of the exemplary computing device 200. Additionally, a server may contain additional components not shown in the exemplary computing device 200. In some embodiments a computing device 200 may operate as both a client device and a server.

For web portals like Yahoo, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. As explained previously, once a common user is identified, a profile may be merged among the identifiers to establish a common user profile, which may then be used to target advertisements for each of the identifiers.

An "ad server" comprises a server that serves online advertisements for presentation to users. "Ad serving" refers to methods used to place online advertisements on websites, in applications, or other places where users are more likely to see them, such as during an online session or during computing platform use, for example. An "ad server" may select advertisements to present to users through collaborative filtering. The advertisements may be stored local to the "ad server", or the ad-server may select third-party ads to serve an available impression.

Overview of Collaborative Filtering (CF)

Collaborative filtering (CF) is one of the most widely used approaches for constructing recommender systems, commonly implemented via latent factor models (LFM) or neighborhood methods. The difference between these techniques is that LFM models users and items in the same (latent factor) space and predicts whether a user is interested in an item based on their relationship in that space, whereas neighborhood methods predict the interest based on the relationship of the user to other users or the relationship of the item to other items. For example, the item-item approach predicts the tendency of a user to an item by inspecting her ratings of items that tend to be rated similarly by other users.

In the LFM approach, items and users are associated with latent factor vectors and biases. The vectors capture the users' and items' characteristics through latent factors, and the biases capture either the likelihood that the user will be interested in an arbitrary item (the user bias) or the likelihood that an arbitrary user will be interested in the item (the item bias). The latent factor vectors and biases are inferred from the observed interactions, which are assumed to be drawn from patterns reflecting the users' tastes.

Methods of the present disclosure employ a common realization of LFM which is based on low-rank matrix factorization to infer the entities' vectors and biases. This approach is appealing due to its high predictive accuracy and good scalability and it provides a substantial expressive power that allows modeling specific data characteristics such as temporal effects, item taxonomy, and attributes.

To overcome the item cold-start problem, the disclosed method and system attempts to select users that are likely to be interested in the new item and are thus expected to provide feedback. To detect such users, the method excavates the interested users' representing characteristics. It begins with selecting users with distinct tastes until obtaining the first feedback. Once a user provides feedback, other users are selected that are similar to the user providing feedback and are thus more likely to provide additional feedback on the new item.

The disclosed system and method occur in a setting of online explorations, where users arrive one after the other, and thus requires online computations. In online computation settings, the input sequence is unknown and must be processed upon its arrival. A well-studied problem in this field is known as "the secretary problem". In this problem, the goal is to hire the secretary with the highest value from an unknown series of secretaries arriving one by one, with each secretary assigned a value that is revealed upon her arrival. With the arrival of each new secretary, a decision must be made whether to hire her (and end the process) or decline her (which is an irrevocable decision) and wait for a future, possibly better, secretary. Due to this limitation, the goal in solving such problems is to obtain a good secretary, e.g., one whose value is guaranteed not to be too far from the best secretary's value.

The secretary problem has been extensively studied as well as its variants. A relevant variant is the k secretary problem, in which the k best secretaries need to be hired. The problem of selecting a user to present an item in a cold-start can be envisioned as the k secretary problem. The series of secretaries are the series of users arriving and available to present them the new item; the value of k is the predefined number of users that may be selected; and the value of the users (the secretaries) needs to be evaluated to determine if they should be presented with an item.

Framework

CF relies on latent factor vectors and biases inferred from observed interactions. The observed interactions are used to train a model to learn the latent factor vectors and biases for users and items. The cold-start problem can be reduced by ensuring that early interactions result in useful observations. This is done by carefully selecting a few known users for exploring the new items and then estimating the new items' vectors and biases from their interactions (feedback or lack of feedback), latent vectors, and biases. The problem at hand is reduced to selecting users that are likely to provide interactions for the new item, thus quickly estimating the vector and bias of the new item without training the whole model.

A recommender system's data can be assumed as follows:
N users: $U=\{u_1, u_2, \ldots, u_N\}$,
M "old" items: $Q=\{q_1, q_2, \ldots, q_M\}$, and
N·M interactions: $I: U \times Q \rightarrow \{0,1\}$, where $I(u,q)$ equals 1 if u provided feedback to q, or 0 otherwise. It is further assumed that the system has learned from these interactions a CF-model that captures characteristics of users and items via real-valued column vectors of dimension d (where d is typically small) and real-valued biases. Based on this model, the system estimates the interest of a user u in an item q as follows:

$$\tilde{I}(u,q) = V_u^T \cdot V_q + b_u + b_q + \mu$$

where $V_u$ and $V_q$ are the latent vectors, $b_u$ and $b_q$ are the biases, and $\mu$ is the average feedback rate:

$$\mu = \frac{1}{|U \times Q|} \cdot \sum_{u \in U, q \in Q} I(u,q)$$

It is in this setting that the cold start problem is defined. Given:
a new item i,
a candidate set $U_A (\subseteq U)$ revealed in an online fashion, and
a budget of k users for exploring i,
select k users from $U_A$ to provide interactions with i and accordingly compute a latent factor vector and bias for i obtaining the lowest root mean squared error (RMSE), where:

$$RMSE = \sqrt{\frac{1}{|U|} \cdot \sum_{u \in U} (\tilde{I}(u,i) - I(u,i))^2}$$

To compute the new item's latent factor vector $V_i$ and bias $b_i$ from a set of interactions it is assumed that given k users $U_i=\{u_{j1}, \ldots u_{jk}\}$, their vectors, biases, and interactions with the new item: $I_i: U_i \rightarrow \{0,1\}$. $V_i$ and $b_i$ are then defined to be those values minimizing the mean squared error, namely:

$$(V_i, b_i) = \underset{V_i', b_i'}{\operatorname{argmin}} \sum_{u \in U_1} ((V_u^T \cdot V_i' + b_u + b_i' + \mu) - I_i(u))^2$$

This equation can be solved analytically, yielding the solution:

$$(V_i, b_i) = \left( \sum_{u \in U_1} V_u' \cdot V_u'^T \right)^{-1} \left( \sum_{u \in U_1} (I_i(u) - b_u - \mu) \cdot V_u' \right)$$

where $V_u'$ is the concatenated column vector $(1, V_u)$. As noted in the above solution, the left term might be non-invertible, however, in practice a regularization term $$\lambda \cdot (\|V_i'\|^2 + b_i'^2)$$

is added to the equation resulting in a different and invertible term:

$$\left( \lambda \cdot I + \sum_{u \in U_1} (V_u' \cdot V_u'^T) \right)^{-1}$$

where I is the identity matrix.

To model a realistic setting it is assumed that the candidate set $U_A$ is revealed in an online fashion, i.e., users arrive one by one. Upon the arrival of a user, an immediate decision is required on whether she is chosen for exploring the new item. If a user u is selected, a binary interaction $I_i(u)$ is revealed, indicating if u is interested in the new item i.

To select users in such online setting, k users are selected in k intervals where each interval is divided into a learning phase and a selection phase. During the learning phase, users are not selected but instead evaluated via a score function, $F_s$, and the best score is recorded. After the learning phase is completed, the selection phase begins and the first user whose score is greater or equal to the recorded score is selected. If no such user arrives, the last user of the selection phase is selected. Once a user is selected, the next interval begins. The size of each interval is at most $U_A/k$ thus enabling equal intervals.

The following pseudo code summarizes this approach. It receives the new item i, the candidate set $U_A$ that is revealed in a stream, the budget k, and the score function $F_s$. The algorithm's goal is to select k users from $U_A$ and return the set D of selected users and their interactions with i. In case $F_s$ requires an auxiliary data structure A, which is initialized at the beginning and updated after each user selection.

| Item Cold-Start Exploration Framework |
|---|
| Input: A new item i, a candidate set $U_A$, a budget k, and a score function $F_s$. |
| Output: The set of selected users and their interactions Di. |
| 1    $D_i = \emptyset$ |
| 2    phase= $0.5 \cdot |U_A|/k$ |
| 3    initialize the auxiliary data structure A |
| 4    for i = 0; i < k; i ++ do |
| 5        $s_m = -\infty$ |
| 6        for j = 0; i < phase; j++ do // The learning phase |
| 7            Upon the arrival of a new user u from $U_A$: |
| 8            $s_m = \max(s_m, F_s(u,A))$ |
| 9        for j = phase; j < 2 phase; j ++ do // The selection phase |
| 10       Upon the arrival of a new user u from $U_A$: |
| 11       if $F_s(u,A) \geq s_m$ or j == phase − 1 then |
| 12           $I_i(u)$ = getInteraction(u, i) |
| 13           $D_i = D_i \cup \{(u, I_i(u))\}$ |
| 14           update the auxiliary data structure A |
| 15           break |
| 16   return $D_i$ |

The described method aims to discover (excavate) the representing latent vector of the users that are interested in the new item. To this end, it maintains a vector that converges to this average latent vector. This vector is termed the Best Estimate Latent Vector or BELV, and it is the auxiliary data structure described in the previous section. The BELV is initialized with zeros and is updated to the vector $V_i$ based on all revealed interactions.

The score function $F_s$, returns the sum of the user bias and the dot product of the user's latent factor vector and the BELV, namely: $F_s(u; \text{BELV}) = V_u^T \cdot \text{BELV} + b_u$. The dot product captures the similarity of u to the BELV and thus the likelihood that u will provide feedback to i, while the user's bias captures the likelihood that u will provide feedback to an arbitrary item, as the bias is positively correlated to the number of old items for which u provided feedback. In the first iteration, $F_s$ boils down to the user bias, namely it guides to select users who tend to provide feedback.

This approach is guided by two principles: (i) to excavate the new item's vector it is required to reveal as much feedback as possible (because user feedback is sparse), and (ii) the user whose score is maximal is assumed to be the most interested in the new item. Driven by these two guidelines, the method selects the users that are believed to be more likely to provide feedback and thus will help to excavate the BELV. In addition, the method leverages the co-existence of the users' and items' latent vectors in the same latent space by computing the BELV as if it were the new item's vector while treating it as capturing the representing latent vector of the interested users. Hence, since the BELV and the estimated latent vector of the new item are computed in the same manner, not only does the method converge towards selecting the interested users but also it is a semi-greedy algorithm to estimate the new item's vector.

Example

As a qualitative illustration of how the method converges towards selecting the interested users, consider FIGS. 3-8. To simplify presentation, assume an offline setting. In FIG. 3, a set of candidates 300 is revealed and in FIG. 4, the first selected user 302 is the one with the maximal positive interactions. Assume the first selected user 302 does not provide feedback to the new item. The BELV 304 is updated to capture this negative interaction, and the next user 306 with the highest score is in the opposite direction of the first selected user's vector 308. Then, in FIG. 5, the second selected user 306 does not provide feedback either and the BELV 304 is updated to be orthogonal to the two users' vectors 308, 310. In FIG. 6, a third selected user 312 is the first to provide feedback and the BELV 304 roughly remains in the same direction as the third selected user vector 314. The following selected users are assumed to have vectors roughly in the same direction as well. In FIG. 7 and FIG. 8, the two selected users 316, 318 are also assumed to provide feedback, which strengthens the direction of the BELV 304 towards the interested users, thus converging towards the general direction of the interested users.

Computational Complexity

The described method has a computational complexity of O(1). A single score computation of $F_s$ in BELV is O(d) where d is the dimension of the latent factor vectors. The BELV is updated incrementally: after selecting a user, the terms $V_u' \cdot V_u'^T$ and $(I_i(u) - b_u - \mu) \cdot V_u'$ are computed and added to the two terms of the equation, then the left factor inverse is computed, and finally the dot product is computed. Computing these two terms is O(d), computing the inverse is $O(d^2)$ since this term is a symmetrical matrix, and the final dot product is also $O(d^2)$. Since d is constant (and typically small), the overall complexity is O(1).

Multiple Items

The framework may be extended to encompass a multi item cold-start. Assuming a recommender system whose data is:

N users: $U = \{u_1, u_2, \ldots, u_N\}$,
M "old" items: $Q = \{q_1, q_2, \ldots, u_M\}$,
N·M interactions: I: $U \times Q \to \{0,1\}$, where I(u,q) equals 1 if u provided feedback to q, or 0 otherwise, and
L "new" items: $L = \{i_1, i_2, \ldots, i_L\}$.

It is further assumed that the system has learned from these interactions a CF-model that captures characteristics of users and items via real-valued column vectors of dimension d (where d is typically small) and real-valued biases. Based on this model, the system estimates the interest of a user u in an item q as follows:

$$\tilde{I}(u,q) = V_u^T \cdot V_q + b_u + b_q + \mu$$

where $V_u$ and $V_q$ are the latent vectors, $b_u$ and $b_q$ are the biases, and $\mu$ is the average feedback rate:

$$\mu = \frac{1}{|U \times Q|} \cdot \sum_{u \in U, q \in Q} I(u, q).$$

As in the single new item setting, it is assumed that the candidate set $U_A$ is revealed in an online fashion, i.e., users arrive one by one. Upon the arrival of a user, an immediate decision is required on whether she is chosen for exploring one of the new items or she is redirected to regular serving system. If a user u is selected to explore an item i∈L, a binary interaction $I_{i'}(u)$ is revealed, indicating if u is interested in the new item i.

To generalize the method to handle multiple new items exploration, two different approaches are disclosed, although other options are possible. The first approach is to apply a similar method as the one used for the single new item exploration for choosing k·L items with a new score function defined to be the maximum score over the L new items, i.e., $\max_{i \in L} F_s$ (When an item reaches its budget of k users it is removed from the list of new items.) This is presented formally as the following pseudo code.

---
Multi Item Cold-Start Exploration Framework
---
Input: A set of new items L, a candidate set $U_A$, for each item i ∈ L, a budget k, and a score function $F_s^i$.
Output: For each item i ∈ L, a set of selected users and their interactions $D_i$.
1  $D_i$ = ∅, ∀i ∈ L
2  L'= L
3  phase= 0.5 · |$U_A$| / (k·L)
4  initialize the auxiliary data structure A
5  for l = 0; l < k · L; l + + do
6      $s_m$ = −∞
7      for j = 0; j < phase; j + + do // The learning phase
8          Upon the arrival of a new user u from $U_A$ consider all i ∈ L':
9          $s_m$ = max($s_m$, $\max_i F_s^i$ (u, A))
10     for j = phase; j < 2 · phase; j + + do // The selection phase
11         Upon the arrival of a new user u from $U_A$:
12             i' = arg max $F_s^i$ (u, A), i' ∈ L'
13             if $F_s^{i'(u, A)} \geq s_m$ or j == phase −1 then
14                 $I_{i'}(u)$ = getInteraction(u, i')
15                 $D_{i'}$ = $D_{i'}$ ∪ {(u,$I_{i'}(u)$)}
16                 remove i' from L' in case it reached k users and update the auxiliary data structure A
17                 break
18 return $D_i$ The second approach is to divide the input sequence into k equal intervals. In each interval one user is selected for each new item, i.e., a total of L users are selected in each interval for exploration (assuming $U_A$=k>L). Each interval is divided into a learning phase and a selection phase. During the learning phase, users are not selected but instead evaluated via a score function, $F_s^i$, and the best score for each item is recorded. After the learning phase is completed, the selection phase begins and a user whose score is not lower than the recorded score of one of the items is selected. Note that once a user is selected to a certain new item, this item is not considered during the rest of this interval. In addition, if there is more than one item whose score exceed its recorded score, the one with the maximal score is chosen. If there are remaining new items with no assigned users, the last users in the interval are assigned to the unassigned new items, arbitrarily. This approach is presented formally as the following pseudo code.

Figure 9:
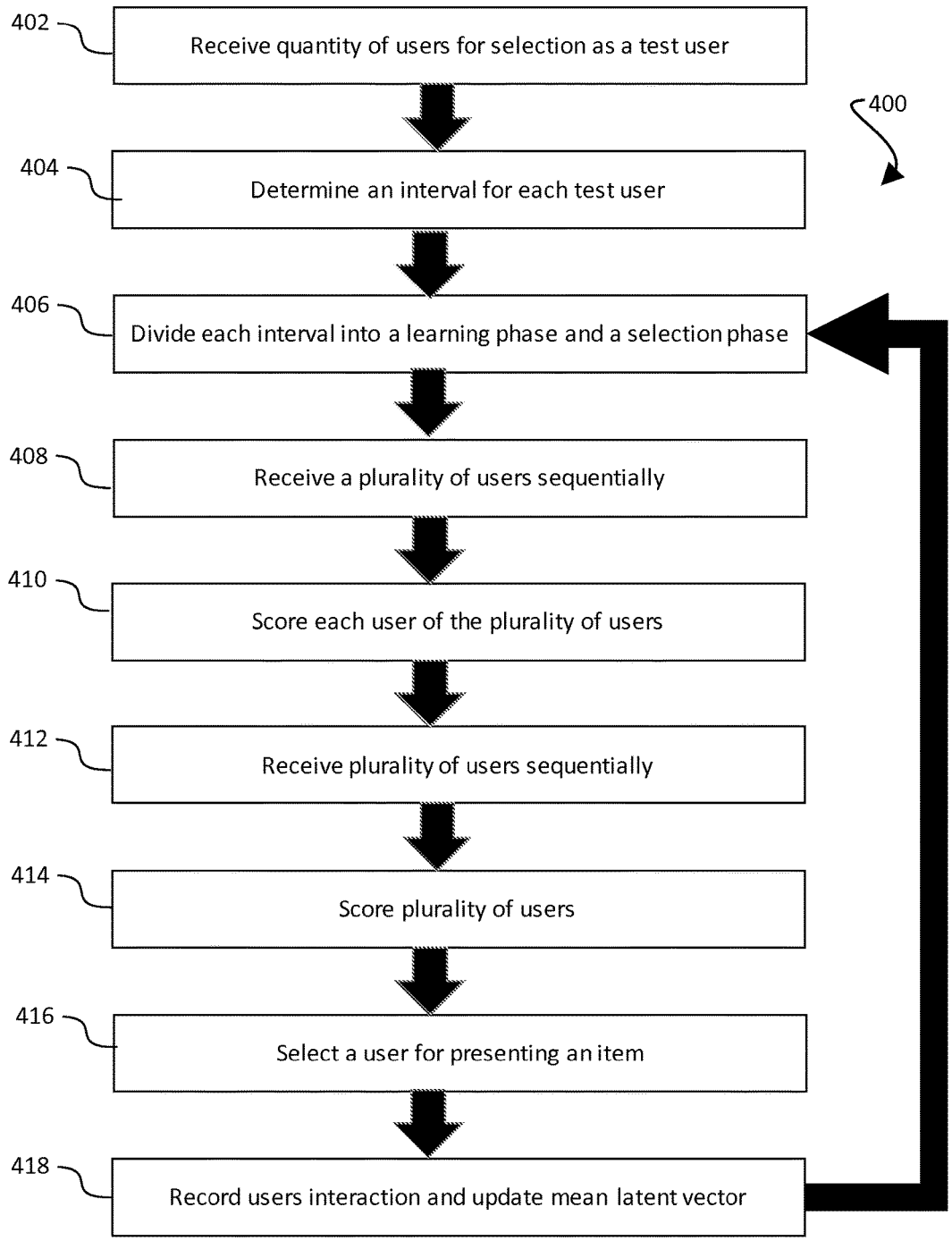
FIG. 9 illustrates a flowchart of a method for building a latent vector and bias for a new item in a cold start recommendation system.

---
Multi Item Cold-Start Exploration Framework
---
Input: A set of new items L, a candidate set $U_A$, for each item i ∈ L, a budget k, and a score function $F_s^i$.
Output: For each item i ∈ L, a set of selected users and their interactions $D_i$.
1  $D_i$ = ∅, ∀i ∈ L
2  phase = 0.5 · |$U_A$| / k
3  initialize the auxiliary data structure A
4  for l = 0; l < k · L; l + + do
5      L'= L
6      $s_m^i$= −∞, ∀i ∈ L
7      for j = 0; j < phase; j + + do // The learning phase
8          Upon the arrival of a new user u from $U_A$ consider all i ∈ L:
9          $s_m^i$ = max($s_m^i$, $\max_i F_s^i$(u, A))
10     for j = phase; j < 2 · phase; j + + do // The selection phase
11         Upon the arrival of a new user u from $U_A$:
12             if Exist I ∈ L' such that $F_s^i$ (u, A) ≥ $s_m^i$ then
13                 i' = max{i ∈ L': $F_s^i$(u, A)} ≥ $s_m^i$
14             else if j == phase −|L'| then
15                 i' = random item in L'
16             else
17                 continue
18             $I_{i'}(u)$ = getInteraction(u, i')
19             $D_{i'}$ = $D_{i'}$ ∪ {(u,$I_{i'}(u)$)}
20             remove i' from L' in case it reached k users and update the auxiliary data structure A
21 return $D_i$, ∀i ∈ L FIG. 9 illustrates a flowchart of a method 400 for building a new item latent vector and bias. In block 402 a quantity of users are received for selection. Once the budget, or number of users is known, an interval is determined for selecting each of the k exploring users in block 404. For example, if the budget is twenty users, twenty intervals will be determined. The intervals define the total number of users that will be received by the recommender from which to select a user. Each interval is then divided into a learning phase and a selection phase in block 406. In block 408 users are received sequentially and each user is scored to find a maximum score for the users received in the learning phase of that particular interval. Once the maximum score is found, the users continue to be received in block 412. In block 414, the users are scored as they are received and when a user scores higher than the maximum score, in block 416 they are selected to present an item to. The interaction of the user is recorded in block 418 and the BELV is updated based on the interactions, vectors, and biases of the selected users so far. If more intervals remain, the method loops back to block 406 and the next interval is divided and the highest score found using the updated BELV. This process continues until the selected user of the last interval interacts with the item.

The described method may be carried out by a computing device as described in relation to FIG. 2. Instructions may be stored in memory and executed by a processor to carry out each of the described steps. The system and methods described previously provide recognizable benefits in increasing the speed and accuracy of a cold start recommender system. In particular, the described system and methods provide for cold start recommender system that accurate, fast, and requires relatively little computer power.

While various embodiments have been described above, it should be understood that they have been presented by way of example only, and not limitation. It will be apparent to persons skilled in the relevant arts that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method for building a latent item vector and item bias for a new item in a collaborative filtering recommendation system, wherein each user has a vector representing a user's characteristics and a bias representing the likelihood that the user will be interested in an arbitrary item, the method comprising:
- determining a first quantity of users to use as a training group and a second quantity of users to use as a recommendation group;
- receiving a first plurality of users with each user received sequentially;
- scoring each of the first plurality of users based on each user's vector and bias, and an best estimate latent vector to find a maximum individual score for the first plurality of users;
- receiving a second plurality of users with each user received sequentially;
- scoring each of the second plurality of users as they arrive with each user's vector and bias, and the best estimate latent vector;
- in response to an event selected from the group consisting of receiving a user of the second plurality of users with a score greater than the maximum individual score and receiving a final user from among the second plurality of users, selecting the user for presenting the item; and
- recording the selected user's interaction with the item and updating the best estimate latent vector, wherein the updating is based on the selected user's vector, bias, and the selected user's interaction with the item.

2. The method of claim 1, wherein calculating each score comprises adding the user's bias to a dot product of the user's vector and the best estimate latent vector.

3. The method of claim 1, wherein the best estimate latent vector is updated to a vector and bias that give a minimum squared error between a predicted interaction and the selected user's interaction.

4. The method of claim 3, further comprising:
- determining a third quantity of users to use as a second training group and a fourth quantity of users to use as a second recommendation group;
- receiving a third plurality of users with each user received sequentially;
- scoring each of the third plurality of users based on each user's vector and bias, and the updated best estimate latent vector to find a second maximum individual score for the third plurality of users;
- receiving a fourth plurality of users with each user received sequentially;
- scoring each of the fourth plurality of users as they arrive with each user's vector and bias, and the updated best estimate latent vector;
- in response to an event selected from the group consisting of receiving a second user of the fourth plurality of users with a score greater than the second maximum individual score and receiving a second final user from among the fourth plurality of users, selecting a second user for presenting the item; and
- recording the selected second user's interaction with the item and updating the best estimate latent vector and bias, wherein the updating is based on the second user's vector, bias, and the selected user's interaction with the item.

5. The method of claim 1, wherein the training group and the selection group each have the same quantity of users.

6. The method of claim 1, wherein the updating the best estimate latent vector is initially a zero vector.

7. A method for building a latent item vector and item bias for a new item in a collaborative filtering recommendation system, wherein each user has a vector representing a user's characteristics and a bias representing the likelihood that the user will be interested in an arbitrary item, the method comprising:
- receiving a quantity of users for selection as a test user;
- determining an interval for each of the quantity of users for selection as a test user;
- dividing each interval into a training phase and a selection phase; and
- for each interval:
- sequentially receiving a first plurality of users during the training phase;
- scoring each of the first plurality of users based on each user's vector and bias, and an best estimate latent vector to find a maximum individual score for the first plurality of users;
- sequentially receiving a second plurality of users during the selection phase;
- scoring each of the second plurality of users as they arrive with each user's vector and bias, and the best estimate latent vector;
- in response to an event selected from the group consisting of receiving a user of the second plurality of users with a score greater than the maximum individual score and receiving a final user from among the second plurality of users, selecting the user for presenting the item; and
- recording the selected user's interaction with the item and updating the best estimate latent vector and bias to an updated best estimate latent vector and bias that gives a minimum squared error between predicted interactions of previously selected users and the actual interactions of the previously selected users, wherein the updating is based on the previously selected users' vectors, biases, and the previously selected users' actual interactions with the item.

8. The method of claim 7, wherein calculating each score comprises adding the user's bias to a dot product of the user's vector and the best estimate latent vector.

9. The method of claim 7, wherein each interval contains the same number of users.

10. The method of claim 7, wherein the training phase and the selection phase have the same number of users.

11. The method of claim 7, wherein the best estimate latent vector is initially a zero vector.

12. The method of claim 7, wherein the interaction comprises rating the item.

13. The method of claim 7, wherein the method builds a latent item vector and item bias for a plurality of new items.

14. The method of claim 13, wherein each of the users is scored for each of the plurality of items and the maximum score is the maximum for all of the items.

15. The method of claim 13, wherein each of the users is scored for each of the plurality of items and a maximum score is saved for each item.

16. The method of claim 13, wherein each of the users is scored for each of the plurality of items and the combination of a user and item having the highest score is selected.

17. A system for building a latent item vector and item bias for a new item in a collaborative filtering recommendation system, wherein each user has a vector representing a user's characteristics and a bias representing the likelihood that the user will be interested in an arbitrary item, the system comprising:
- a processor;
- memory storing computer executable instructions, that when implemented by the processor cause the system to perform functions comprising:
- receiving a quantity of users for selection as a test user;

determining an interval for each of the quantity of users for selection as a test user;
dividing each interval into a training phase and a selection phase; and
for each interval:
sequentially receiving a first plurality of users during the training phase;
scoring each of the first plurality of users based on each user's vector and bias, and an best estimate latent vector to find a maximum individual score for the first plurality of users;
sequentially receiving a second plurality of users during the selection phase;
scoring each of the second plurality of users as they arrive with each user's vector and bias, and the best estimate latent vector;
in response to an event selected from the group consisting of receiving a user of the second plurality of users with a score greater than the maximum individual score and receiving a final user from among the second plurality of users, selecting the user for presenting the item; and
recording the selected user's interaction with the item and updating the best estimate latent vector and bias to an updated best estimate latent vector and bias that gives a minimum squared error between predicted interactions of previously selected users and the actual interactions of the previously selected users, wherein the updating is based on the previously selected users' vectors, biases, and the previously selected users' actual interactions with the item.

* * * * *